W. R. SWEET.
AUTOMATIC COUPLING FOR TRAIN PIPES.
APPLICATION FILED MAR. 17, 1915.
1,150,717.
Patented Aug. 17, 1915.
2 SHEETS—SHEET 1.
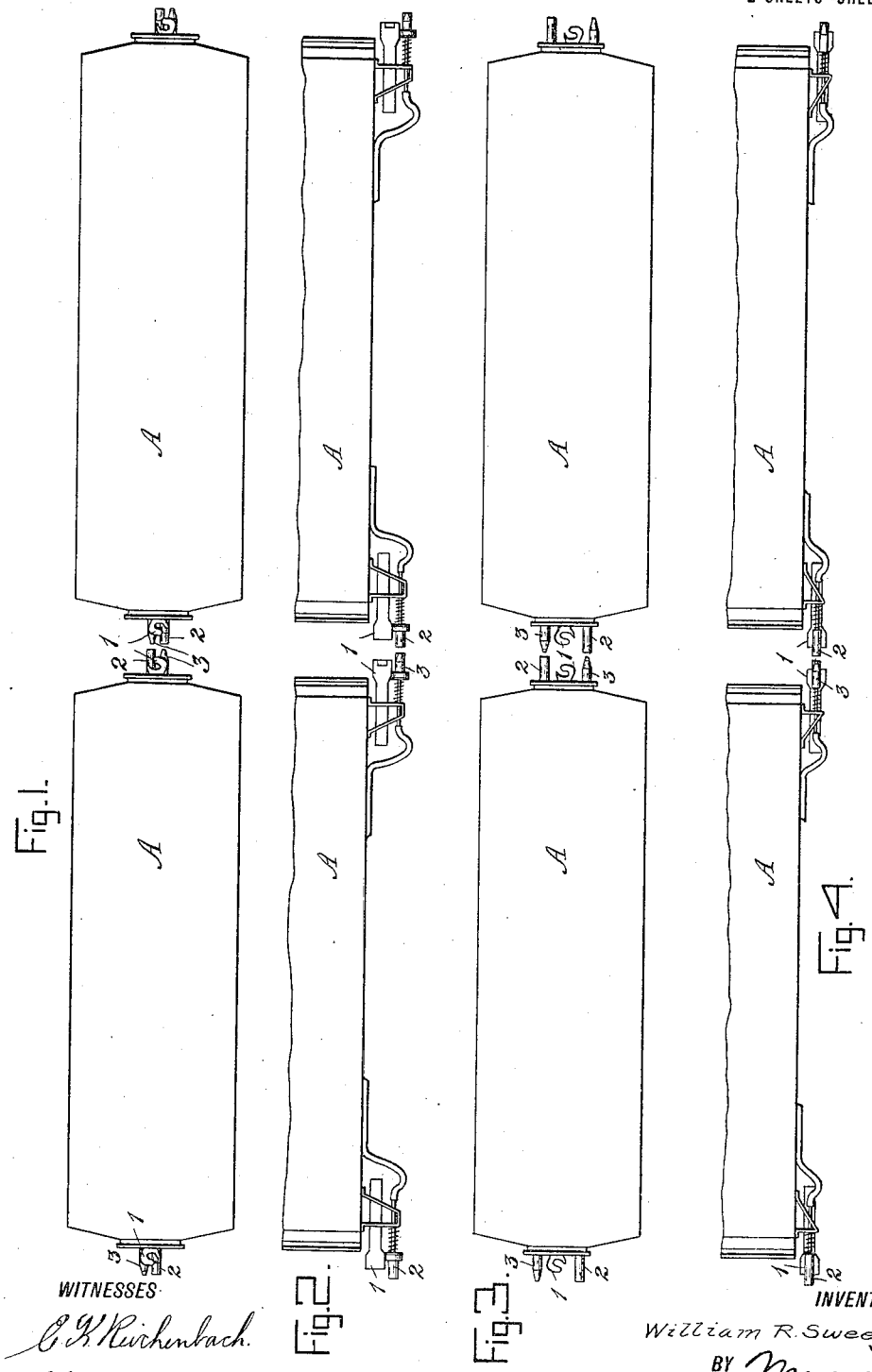

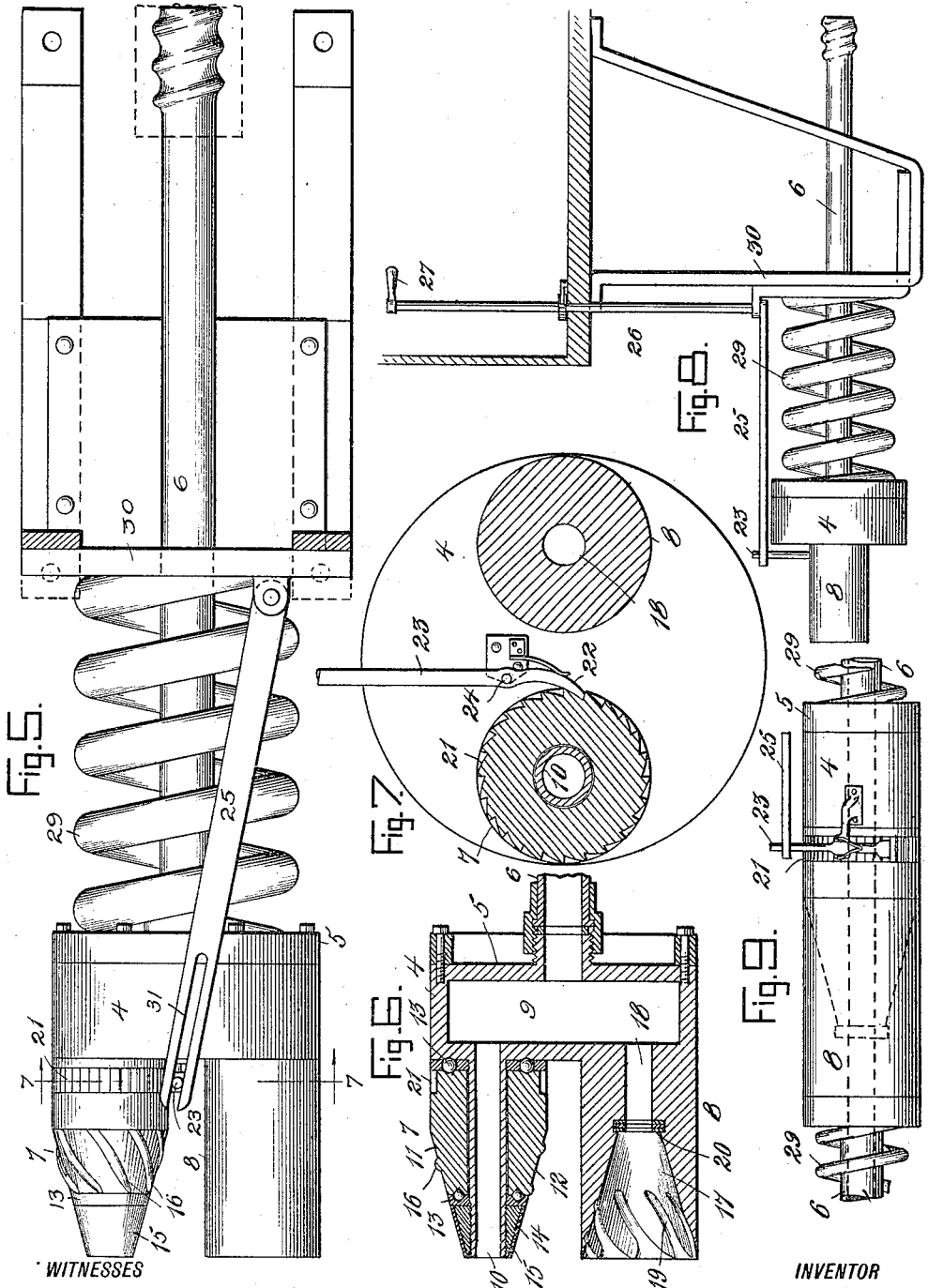

UNITED STATES PATENT OFFICE.

WILLIAM RUSSELL SWEET, OF WAKEFIELD, RHODE ISLAND, ASSIGNOR OF ONE-HALF TO WILLIAM H. GRIFFITH, OF NARRAGANSETT PIER, RHODE ISLAND.

AUTOMATIC COUPLING FOR TRAIN-PIPES.

1,150,717. Specification of Letters Patent. Patented Aug. 17, 1915.

Application filed March 17, 1915. Serial No. 14,961.

*To all whom it may concern:*

Be it known that I, WILLIAM R. SWEET, a citizen of the United States, and a resident of Wakefield, in the county of Washington and State of Rhode Island, have invented a new and Improved Automatic Coupling for Train-Pipes, of which the following is a full, clear, and exact description.

This invention relates to coupling devices especially adapted for steam or air pipes of the heating or air-brake system of trains, so that when two cars are automatically coupled by the draft devices, the air, or steam pipes, or both, will be automatically coupled.

The invention has for its general objects to improve and simplify the construction and operation of automatic coupling devices of the character referred to so as to be reliable and efficient in use, comparatively simple and inexpensive to manufacture, install and keep in repair, and so designed that the parts will be automatically locked and tight joints maintained as long as the cars are coupled together.

A further object of the invention is the provision of means for permitting the air or steam pipe couplings to be released from the car platform when two cars are to be uncoupled.

With such objects in view, and others which will appear as the description proceeds, the invention comprises various novel features of construction and arrangement of parts which will be set forth with particularity in the following description and claims appended hereto.

In the accompanying drawings, which illustrate certain embodiments of the invention, and wherein similar characters of reference indicate corresponding parts in all the views, Figure 1 is a plan view of two cars about to be coupled; Fig. 2 is a fragmentary side view of the cars shown in Fig. 1; Fig. 3 is a plan view of two cars about to be coupled, the train and steam pipe couplings being disposed in the same plane with the automatic draft couplers; Fig. 4 is a fragmentary side view of the cars shown in Fig. 3; Fig. 5 is an enlarged plan view of the twin coupler; Fig. 6 is a horizontal sectional view of the twin coupler; Fig. 7 is a vertical section on the line 7—7, Fig. 5, drawn on an enlarged scale; Fig. 8 is a side view of a single coupler on one end of a car; and Fig. 9 is a side view of the two parts of a single coupler united.

Referring to the drawings, A designates the two cars of a train about to be coupled by the two sections 1 of the automatic coupling device commonly used on cars, and at the same time the cars are coupled the coupling sections 2 and 3 of the air and train pipe lines are automatically coupled. The coupling sections 2 and 3 at the ends of the car may be disposed under the linking couplings 1, as shown in Figs. 1 and 2, or they may be disposed in the same horizontal plane with the linking couplings and at opposite sides thereof, as shown in Figs. 3 and 4. It will be noted that the coupling sections 2 and 3 at one end of each car are oppositely disposed with respect to the coupling sections at the opposite end, so that the coupling sections of two cars will always mate.

The details of the coupling device are shown in Figs. 5 to 9 inclusive. In the first three of these figures a double or twin coupling device is shown, and the same consists of a body 4 fastened to a head plate 5 carried by a hollow rod or pipe 6, and on this body are stud and socket elements 7 and 8 which are adapted respectively to enter and receive socket and stud elements of a coupling device on another car. The pipe 6 communicates with a chamber 9 in the body 4 and the stud elements 7 include a hollow shaft 10 which communicates with the chamber 9. On this shaft is a rotatable locking member 11 having a conical portion 12, and at the ends of this member 11 are anti-friction bearings 13 for insuring free rotation. Threaded on the outer end of the shaft 10 is a conical nut or collar 14 faced by leather 15 or equivalent material, and by means of this nut or collar the member 11 is held in place. On the conical surface of the member 11 are short helical ribs 16 which are adapted to enter corresponding grooves in the mating socket element of another coupling device, whereby the said elements will be locked by the stud entering the socket element axially. The socket element 8 has a conical socket or chamber 17 to receive a mating stud element, and this chamber communicates by a passage 18 with the chamber 9. In the socket 17 are helical grooves 19 for receiving the helical ribs on a mating stud element. Packing washers 20 are arranged on the inner end of the socket 17, so that the end of the mating stud elements will make a tight joint in the socket. When two coupling devices are united the hollow shafts 10 will register with the passages 18, whereby the steam or air pipes will be connected. During the connecting action of the coupling devices the members 11 of the stud elements will rotate, since the socket elements 8 are stationary, this rotation being due to spiral grooves 19. To prevent the elements 11 from rotating in a direction to unlock, each element 11 has ratchet teeth 21 in its circumference, and coöperating therewith is a spring-pressed pawl 22. A longitudinal pull in a direction to separate the coupling devices is thus resisted, since the members 11 cannot rotate, because of the pawls 22, but when the coupling devices are to be disconnected, the pawls 22 must be released so that the members 11 can freely turn while the coupling devices are moving longitudinally apart. The releasing of the pawls is effected by the latter being carried by levers 23 fulcrumed at 24 on the bodies 4, and the upper end of each lever is connected with a crank 25 operated by a vertical shaft 26 that carries a handle 27 at its upper end, where it can be actuated by the brakeman on the platform 28 of the car, as shown in Fig. 8. The coupling device shown in Figs. 8 and 9 is adapted to have a single train line, and hence the sections of the coupling device have respectively a single stud and a single socket device, since the coupling is adapted for a single train line pipe. Any suitable supporting means may be employed for fastening the coupling device to the bottom of the car.

In both forms of the device a spring or equivalent means 29 is interposed between the head plate 5 and the supporting bracket 30 which attaches the device to the car, and by means of this spring the sections of the train pipe coupling project outwardly far enough to maintain the mated couplings in fluid-tight relation when the cars are coupled by the automatic coupler. In other words, the coupling devices are movably mounted on the cars so that they can be properly united automatically, and the joints will be fluid tight. The levers 25 have their extremities longitudinally slotted at 31, as shown in Fig. 5, so that the upper end of the levers 23 can move back and forth as the devices are coupled and uncoupled.

From the foregoing description taken in connection with the accompanying drawings, the advantages of the construction and method of operation will be readily understood by those skilled in the art to which the invention appertains, and while I have described the device which I now consider to be the best embodiment thereof, I desire to have it understood that the device shown is merely illustrative and that such changes may be made when desired as fall within the scope of the appended claims.

Having thus described my invention, I claim as new and desire to secure by Letters Patent:

1. The combination of cars, train pipe couplers thereon, and yielding means acting on the couplers urging the same together, one coupler having a stud element and the other a socket element to receive the stud element, one of the elements having mounted thereon a rotatable part and the stud element having a part to fit the first-mentioned part, said parts having their surfaces shaped to interlock by a relative rotation, a locking device for permitting the rotatable part to rotate automatically while the elements are coupling axially, and means for releasing the locking device to permit the rotatable part to reversely rotate as the coupling elements uncouple.

2. The combination of cars, train pipe couplers thereon, and yielding means acting on the couplers urging the same together, one coupler having a conical stud element and the other a conical socket element to receive the stud element, one of the elements having mounted thereon a spirally ribbed rotatable part, and the other element having a grooved part interlocked with the first mentioned grooved part, and a locking device for permitting the rotatable part to rotate automatically while the elements are coupling axially, and means for releasing the locking device to permit the rotatable part to reversely rotate as the coupling elements uncouple.

3. The combination of a car, a train pipe coupler mounted thereon, said coupler including a rotatable member having an external surface adapted to interlock with a non-rotatable coupler of another car, said rotatable member having ratchet teeth, a pawl coöperating with the ratchet teeth to permit the member to rotate in one direction only, and means on the car for disengaging the pawl.

4. A coupling device for a train line pipe, comprising a chambered body, a socket coupler element on the said body, a stud coupler element also on the said body, said elements having their axes parallel, one of the elements being provided with helical grooves and the other element with helical ridges, and one of the elements being rotatable, means for locking the rotatable element against rotation in one direction normally, and means for controlling the said means to permit the rotatable element to rotate in the other direction.

5. A train pipe coupler comprising a stud element including a chambered body, a hollow shaft communicating with the body, a rotatable part mounted on the shaft and formed with a conical portion, and a conical member holding the rotatable part on the shaft, and said rotatable part having helical ribs on its conical portion.

In testimony whereof I have signed my name to this specification in the presence of two subscribing witnesses.

WILLIAM RUSSELL SWEET.

Witnesses:
FRANK W. CLEMENS,
GEO. A. KROENER.

Copies of this patent may be obtained for five cents each, by addressing the "Commissioner of Patents, Washington, D. C."